(12) United States Patent
Huang et al.

(10) Patent No.: US 6,225,408 B1
(45) Date of Patent: May 1, 2001

(54) ADHESIVE FORMULATIONS

(75) Inventors: Jian-Ping Huang; Robin F. Righettini, both of Apex; Frances G. Dennis, Cary, all of NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/323,639

(22) Filed: Jun. 1, 1999

Related U.S. Application Data

(60) Provisional application No. 60/089,115, filed on Jun. 12, 1998.

(51) Int. Cl.$^7$ .................................................. C08G 63/46
(52) U.S. Cl. ........................ 525/88; 525/111; 525/113; 525/123; 525/340; 525/374; 525/455
(58) Field of Search .............................. 525/88, 111, 113, 525/123, 340, 455, 374

(56) References Cited

U.S. PATENT DOCUMENTS

| | | | |
|---|---|---|---|
| 4,243,500 | 1/1981 | Glennon | 204/159.12 |
| 4,569,968 | 2/1986 | Uffner et al. | 525/54.5 |
| 4,769,419 | 9/1988 | Dawdy | 525/111 |
| 5,500,293 | 3/1996 | Lau et al. | 428/355 |
| 5,641,834 | 6/1997 | Abbey et al. | 525/77 |
| 5,710,235 | 1/1998 | Abbey et al. | 528/288 |
| 5,728,759 | 3/1998 | Pike | 524/270 |

FOREIGN PATENT DOCUMENTS

| | | |
|---|---|---|
| 0 487 058 | 5/1992 | (EP) . |
| WO 97/39074 | 10/1997 | (WO) . |
| WO 99/64529 | 12/1999 | (WO) . |

*Primary Examiner*—Terressa M. Boykin
(74) *Attorney, Agent, or Firm*—Wayne W. Rupert

(57) ABSTRACT

An adhesive composition including as principal components:
(a) about 10–90% by weight of at least one free radical-polymerizable monomer,
(b) about 0–20% by weight of an adhesion promoter,
(c) about 10–80% by weight of a primary low molecular weight toughener (or toughening agent) with a weight average molecular weight ($M_w$) less than about 18,000 or a number average molecular number ($M_n$) less than about 10,000 and;
(d) about 1–15% by weight of an auxiliary high molecular weight toughener (or toughening agent) with a $M_w$ greater than about 18,000 or a $M_n$ greater than about 10,000 based on the total weight of components (a)–(d).

15 Claims, No Drawings

ADHESIVE FORMULATIONS

This application claims benefit of U.S. Provisional Patent Application No. 60/089,115 filed Jun. 12, 1998.

FIELD OF THE INVENTION

The present invention relates to improved peel strength and improved failure mode of polymerizable or curable reactive adhesives, particularly acrylic adhesives. The invention also relates to improved surface tack and open time of polymerizable or curable reactive adhesives.

BACKGROUND OF THE INVENTION

Acrylic structural adhesives are well known articles of commerce which are extensively used commercially for bonding metal and plastic materials. Acrylic structural adhesives have found growing use in the automotive industry where the adhesive bonding of metal parts is replacing welding and mechanical fastening techniques. However, these applications give rise to unique requirements not easily met by previously available adhesives. These requirements include high bond strength and improved failure mode.

Acrylic adhesives typically comprise a mixture of one or more olefinic reactive monomers such as methyl methacrylate or methacrylic acid and curing agents, with cure or polymerization being effected through a free radical polymerization mechanism. The adhesives preferably contain one or more polymeric materials which may or may not be reactive, that is, capable of being polymerized per se or at least capable of interpolymerizing with the reactive monomers, such as grafting onto or crosslinking the growing polymers from the reactive monomer polymerization. In addition, the adhesives can contain other additives for improving adhesion to substrate materials, environmental resistance, impact strength, flexibility, heat resistance, and the like.

P.C.T. Publication WO 97/39074 discloses the use of at least one polymeric material which can act as a toughening agent in an acrylic adhesive such as polychloroprene, polymer-in-monomer syrup, chlorosulphonated polyethylene rubber, copolymers of butadiene and at least one monomer copolymerizable therewith, for example, styrene, acrylonitrile, methacrylonitrile (e.g. poly(butadiene-(meth) acrylonitrile or poly(butadiene-(meth)acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers). Also disclosed is a redox catalyst system that includes certain para-halogenated aniline reducing agents.

U.S. Pat. No. 4,769,419 ("the '419 patent"), incorporated herein by reference, discloses structural adhesive compositions for metal-metal bonding applications. The adhesives include as tougheners olefinic terminated liquid rubbers which are reacted with monoisocyanate compounds. These tougheners represented by formula I as shown in column 4 and claim 1 of the '419 patent are referred to herein as "urethane modified olefinic-terminated liquid elastomer produced from a carboxylic acid-terminated alkadiene" or, alternatively, as "isocyanate-capped methacrylate-terminated polyalkadiene produced from a carboxylic acid-terminated polyalkadiene". The '419 patent further describes acrylic adhesives with olefinic monomer, olefinic urethane reaction product of an isocyanate-functional prepolymer and a hydroxy-functional monomer, phosphorus-containing compounds, an oxidizing agent and a free radical source.

U.S. Pat. No. 5,641,834 ("the '834 patent") and U.S. Pat. No. 5,710,235, both incorporated herein by reference, disclose adhesives that include as tougheners an olefinic-terminated polyalkadiene that includes carboxy ester linking groups and at least one nascent secondary hydroxyl group that is capped with a monoisocyanate. These tougheners represented by the formulae for polymer A or polymer B in claim 1 are referred to herein as "olefinic-terminated liquid elastomer produced from a hydroxyl-terminated polyalkadiene" or, alternatively, as "isocyanate-capped methacrylate-terminated polyalkadiene produced from a hydroxyl-terminated polyalkadiene". The composition also includes a free radical-polymerizable monomer such as an olefinic monomer and, optionally, a second polymeric material. In a preferred embodiment the composition is an adhesive that also includes a phosphorus-containing compound and an ambient temperature-active redox catalyst. The '834 patent describes polymers A and B with a number average molecular weight of about 1,500 to 10,000, preferably about 1,500 to 6,000.

Peel strength and failure mode of the above-described prior structural adhesives leave room for improvement.

U.S. Pat. No. 5,728,759 ("the '759 patent") discloses non-structural waterbased pressure sensitive adhesives and methods of preparation including an adhesive entity, a tackifier resin, a plasticizer, stabilizer, curing entity and optional additives. Objects of the '759 patent include providing masking tapes that do not freeze to an automobile body or window on exposure of the tapes to relatively high temperatures while in contact with such surfaces. Elastomeric block copolymers usable in the adhesive entity include block copolymers "EUROPRENE™ Sol T 193" from Enichem AMERICAS.

U.S. Pat. No. 5,500,293 is directed to a non-structural adhesive composition suitable for use in an insulating tape having improved plasticizer resistance, including from about 13% to about 42% of a polyisoprene homopolymer, from about 13% to about 42% of a styrene-isoprene-styrene copolymer, and from about 25% to about 55% of an aliphatic tackifying agent. The styrene-isoprene-styrene copolymers disclosed include EUROPRENE™.

Additional important features of acrylic adhesives are surface tack and open time.

As used herein, "surface tack" means the amount of adhesive on an exposed surface of the applied adhesive that does not undergo curing. Such uncured adhesive can be transferred to other parts of the assembly or to the application equipment resulting in increasing clean-up costs. A common cause of surface tack is referred to as "air inhibition" since atmospheric oxygen is a powerful inhibitor of free radical reactions. Accordingly, the amount of surface tack can be measured by determining the thickness of any uncured adhesive on the surface.

In typical applications of two-part reactive adhesive systems, the two parts are mixed together, the mixed material is applied to a first substrate for bonding then a second substrate is contacted to the adhesive-applied first substrate. The time required for such mixing, applying and contacting is referred to herein as "open time". Of course, the substrates must be contacted together prior to final cure of the adhesive.

Although the surface tack and open time of acrylic adhesives commercially available from Lord Corporation are more than adequate for many applications these characteristics could be improved.

SUMMARY OF THE INVENTION

Accordingly, it is an object of the invention to provide an adhesive with improved peel strength, improved failure mode and improved air inhibition or surface tack resistance for a longer period of open time.

It is yet another object of the invention to provide an adhesive that incorporates cost effective tougheners while maintaining high T-peel strength and improved failure mode.

One embodiment of the first invention is directed to an adhesive including as principal components:

(a) about 10–90% by weight of at least one free radical-polymerizable monomer, (b) about 0–20% by weight of an adhesion promoter, (c) about 10–80% by weight of a primary low molecular weight toughener (or toughening agent) with a weight average molecular weight ($M_w$) less than about 18,000 or a number average molecular number ($M_n$) less than about 10,000 and;

(d) about 1–15%, preferably 1–10%, by weight of an auxiliary high molecular weight toughener (or toughening agent) with a $M_w$ greater than about 18,000 or a $M_n$ greater than about 10,000 based on the total weight of components (a)–(d).

According to another embodiment of the invention there is provided an acrylic adhesive comprising at least one free radical polymerizable monomer and at least two tougheners, wherein a first toughener has a $M_w$ that is at least 50% greater than a $M_w$ of a second toughener.

According to a further embodiment of the invention there is provided an acrylic adhesive comprising at least one free radical polymerizable liquid monomer and at least two tougheners, wherein a first toughener has a solubility in said liquid monomer and a second toughener has a solubility in said liquid monomer higher than the solubility of the first toughener.

According to a preferred embodiment of the invention there is provided an adhesive composition having improved air inhibition or surface tack resistance and extended open time that includes components (a)–(d) above and at least one reducing agent (e) having the formula

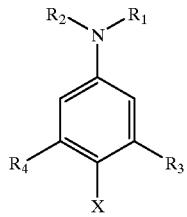

wherein each of $R_1$ and $R_2$, which may be the same or different, is independently selected from the group consisting of linear or branched, saturated or unsaturated, C1–C10 alkyl and linear or branched, saturated or unsaturated, C1–C10 hydroxyalkyl (i.e., alkyl substituted by —OH);

each of $R_3$ and $R_4$ is independently selected from the group consisting of hydrogen and linear or branched, saturated or unsaturated C1–C10 alkyl; and X is halogen;

and at least one oxidizing agent (f) that is co-reactive with the reducing agent in an amount effective to generate free radicals and to initiate and propagate polymerization of the free radical polymerizable liquid monomer.

DETAILED DESCRIPTION OF THE INVENTION

In working with acrylic adhesives including low molecular weight tougheners, applicants discovered that such adhesives exhibit inferior T-peel strength. Surprisingly, applicants were able to solve this problem by including relatively small amounts of inexpensive high molecular weight tougheners with a $M_w$ of more than about 18,000 in the adhesive formulation. One of ordinary skill in the art would not have expected such a low percentage of a high molecular weight toughener such as EUROPRENE™, typically used as a tackifier in non-structural adhesives, to provide substantial improvements in peel strength and failure mode. Moreover, previous adhesives incorporating polymers such as polychloroprene, polymer-in-monomer syrup, and chlorosulphonated polyethylene rubber are typically brittle. Another surprising advantage associated with the incorporation of high molecular weight tougheners is that good T-Peel strength is observed even when the less expensive isocyanate-capped methacrylate-terminated polyalkadiene produced from a hydroxyl-terminated polyalkadiene toughener is used instead of the more expensive and higher odor isocyanate-capped methacrylate-terminated polyalkadiene produced from a carboxyl acid-terminated polyalkadiene toughener.

As used herein, the "principal components" of the invention are at least one free radical-polymerizable monomer, an optional adhesion promoter, at least two tougheners, an oxidizing agent and a reducing agent.

The invention includes about 10–90% by weight of the principal components of at least one free radical-polymerizable monomer. Free radical-polymerizable monomers in accordance with the invention are olefinic monomers that are characterized by the presence of a —C=C— group. Representative olefinic monomers include esters of (meth)acrylic acid such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate; methacrylic acid; acrylic acid; substituted (meth)acrylic acids such as itaconic acid, acrylonitrile, methacrylonitrile, acrylamide and methacrylamide; styrene; substituted styrenes such as vinyl styrene, chlorostyrene, methyl styrene and n-butyl styrene; vinyl acetate; vinylidene chloride; and butadienes such as 2,3-dichloro-1,3-butadiene and 2-chloro-1,3-butadiene. Other olefinic monomers include maleate esters; fumarate esters; and styrenic compounds such as styrene, chlorostyrene, methylstyrene, butylstyrene and vinyl styrene. Tetrahydrofurfuryl methacrylate (THFMA), methacrylic acid and methyl methacrylate are most preferred.

The invention also can include 0–20% by weight of the principal components of an adhesion promoter. An adhesion promoter in accordance with the present invention is any adhesion promoter known to those of ordinary skill in the art as useful in promoting adhesion in acrylic adhesives. Preferred adhesion promoters in accordance with the present invention are phosphorus-containing compounds that enhance metal adhesion and may be any derivative of phosphinic acid, phosphonic acid or phosphoric acid having at least one P—OH group and at least one organic moiety characterized by the presence of an olefinic group, which is preferably terminally located. A listing of such phosphorus compounds is found in U.S. Pat. No. 4,223,115. A preferred phosphorus-containing compound has a structure that may be represented by the formula:

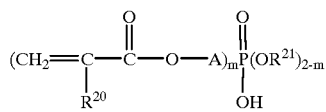

wherein $R^{20}$ is selected from the group consisting of hydrogen, an alkyl group having from one to 8, preferably one to 4, carbon atoms, and $CH_2CH—$; $R^{21}$ is selected from the group consisting of hydrogen, an alkyl group having from one to 8, preferably one to 4 carbon atoms; A is selected from the group consisting of —$R^{22}O$— and $R^{23}O)_n$, wherein $R^{22}$ is an aliphatic or cycloaliphatic alkylene group containing from one to 9, preferably 2 to 6, carbon atoms; $R^{23}$ is an alkylene group having from one to 7, preferably 2 to 4, carbon atoms; n is an integer from 2 to 10, and m is one or 2, preferably one.

Phosphorus-containing compounds having vinyl unsaturation are preferred over such compounds having allylic unsaturation, with monoesters of phosphinic, phosphonic and phosphoric acids having one unit of vinyl or allylic, especially vinyl, unsaturation presently being preferred. Representative phosphorus-containing compounds include, without limitation, phosphoric acid; 2-methacryloyloxyethyl phosphate; bis-(2-methacryloxyloxyethyl)phosphate; 2-acryloyloxyethyl phosphate; bis-(2-acryloyloxyethyl) phosphate; methyl-(2-methacryloyloxyethyl)phosphate; ethyl methacryloyloxyethyl phosphate; methyl acryloyloxyethyl phosphate; ethyl acryloyloxyethyl phosphate; compounds of the above formula wherein $R^8$ is hydrogen or methyl and $R^9$ is propyl, isobutyl, ethylhexyl, halopropyl, haloisobutyl or haloethylhexyl; vinyl phosphonic acid; cyclohexene-3-phosphonic acid; alphahydroxybutene-2 phosphonic acid; 1-hydroxy-1-phenylmethane-1,1-diphosphonic acid; 1-hydroxy-1-methyl-1-disphosphonic acid: 1-amino-1 phenyl-1,1-diphosphonic acid; 3-amino-1-hydroxypropane-1,1-disphosphonic acid; amino-tris (methylenephosphonic acid); gamma-aminopropylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl)phosphinic acid and allyl methacryloyloxyethyl phosphinic acid. A most preferred adhesion promoter is 2-hydroxyethylmethacrylate phosphate.

The first embodiment of the invention includes about 10–80% by weight of the principal components of low molecular weight toughener. A low molecular weight toughener in accordance with the present invention has a $M_w$ of less than about 18,000 or $M_n$ less than about 10,000. The toughening agent provides improved impact and shatter resistance to the resultant adhesive and decreases brittleness. The polymeric material may or may not include an olefinically unsaturated structure that is capable of being polymerized per se or copolymerized with at least one of the free radical polymerizable monomers described above. The polymeric material can be for example, various solid and liquid elastomeric polymeric materials, and in particular liquid olefinic-terminated elastomers as described in U.S. Pat. Nos. 4,223,115; 4,452,944; 4,769,419; 5,641,834 and 5,710,235; and olefinic urethane reaction products of an isocyanate-functional prepolymer and a hydroxy functional monomer, as described in U.S. Pat. Nos. 4,223,115; 4,452,944; 4,467,071 and 4,769,419, the entire disclosure of each which is hereby incorporated by reference.

Representative liquid olefinic-terminated elastomers disclosed in P.C.T. Publication WO 97/39074 include homopolymers of butadiene, copolymers of butadiene and at least one monomer copolymerizable therewith, for example, styrene, acrylonitrile, methacrylonitrile (e.g. poly (butadiene-(meth)acrylonitrile or poly(butadiene-(meth) acrylonitrile-styrene) and mixtures thereof; as well as modified elastomeric polymeric materials, such as butadiene homopolymers and copolymers as noted above modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers).

The most preferred toughener in accordance with the present invention is an olefinic-terminated liquid elastomer produced from a hydroxyl-terminated polyalkadiene as described in the '834 patent. It is preferred over more expensive tougheners such as a urethane modified olefinic-terminated liquid elastomer produced from a carboxylic acid-terminated alkadiene as described in the '419 patent.

The first embodiment of the invention also includes about 1–15% by weight of the principal components, preferably 1–10% by weight of the principal components, and more preferably about 1–5% by weight of the principle components of a high molecular weight toughener. A high molecular weight toughener in accordance with the present invention has a $M_w$ of greater than about 18,000 or a $M_n$ greater than about 10,000. Surprisingly, it has been determined that the use of at least a minor amount of a high molecular weight toughener results in adhesive formulations with substantially improved T-peel strength and improved failure mode from adhesive to cohesive. The high molecular weight toughener of the present invention can be, for example, an A-B-A block copolymer wherein the A block is polystyrene, alpha-methyl styrene, t-butyl styrene, or other ring alkylated styrenes as well as mixtures of some or all of the above and the B block is an elastomeric segment having a low $T_g$ such as that derived from a conjugated diene or an ethylene-propylene monomer. Commercially available examples include EUROPRENE SOL T 193A™ available from Enichem Elastomers Americas, Inc. Other high molecular weight tougheners in accordance with the present invention include, for example, block copolymers and random copolymers including but not limited to polyethylene, polypropylene, styrene-butadiene, polychloroprene, EPDM, chlorinated rubber, butyl rubber, styrene/butadiene/acrylonitrile rubber and chlorosulfonated polyethylene.

Although applicants are not bound by any particular theory, it is believed that small amounts of high molecular weight auxiliary tougheners such as EUROPRENE™ alter the morphology of the cured adhesive. These auxiliary tougheners have, for example, marginal solubility in the monomer (i.e. solubility less than the primary toughener) which may be a result of, for example, the combined properties of high molecular weight, structure of the chain, structure of the end groups and monomer solvency. It is believed that adding a combination of tougheners with varied solubilities results in a desirable micro phase separation of rubber oligomer, that in turn enhances the toughness of the adhesive.

The invention may also include an ambient temperature reactive catalyst system. The ambient temperature-reactive catalyst systems that may be employed in the preferred adhesive systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), dimethyl aniline, p-halogenated aniline derivatives and dimethyl-p-toluidine; and aminealdehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 50 percent by weight of bonding accelerator, with the amount of reducing agent being in the range from about 0.05 to about 10 preferably about 0.1 to about 6, percent by weight of polymerizable adhesive composition. DIIPT is a preferred reducing agent. The most preferred oxidizing agent is benzoyl peroxide.

According to one preferred embodiment of the invention it has been found that the surface tack and open time unexpectedly improves by utilizing certain reducing agents. These reducing agents are p-halogenated aniline derivatives having the formula (I)

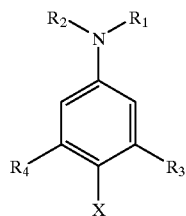

wherein each of $R_1$ and $R_2$, which may be the same or different, is independently selected from the group consisting of linear or branched, saturated or unsaturated, C1–C10 alkyl and linear or branched, saturated or unsaturated, C1–C10 hydroxyalkyl (i.e., alkyl substituted by —OH);

each of $R_3$ and $R_4$ is independently selected from the group consisting of hydrogen and linear or branched, saturated or unsaturated C1–C10 alkyl; and X is halogen.

In a preferred embodiment of formula (I), each of $R_1$ and $R_2$ is independently selected from the group consisting of C1–C4 alkyl and C1–C4 hydroxyalkyl, and more preferably each of $R_1$ and $R_2$ are the same and are methyl or isopropanol; each of $R_3$ and $R_4$ is hydrogen; and X is fluorine, chlorine, bromine, or iodine, and more preferably chlorine or bromine. Exemplary reducing agents of the invention include, but are not limited to, N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

Although the adhesive of the present invention may take many forms, the most preferred adhesive systems are provided as multipack or two-part adhesive systems where one package or part contains the polymerizable or reactive components and the reducing agent and a second package or part contains the oxidizing agent. The two parts are mixed together at the time of use in order to initiate the reactive cure. After mixing the individual packages, one or both surfaces to be joined are coated with the mixed adhesive system and the surfaces are placed in contact with each other.

The second package can include a bonding activator that includes the oxidizing agent for the redox catalyst system. The bonding activator can include:

(1) from about 0.5 to about 50 percent by weight based on total weight of bonding activator of at least one oxidizing agent which can function as an oxidant of a redox couple catalyst system; and (2) from about 30 to about 99.5 percent by weight, based on total weight of bonding accelerator, of a carrier vehicle.

The carrier vehicles which are suitable for use in the bonding activators can be a simple inert solvent or diluent such as methylene chloride, or butyl benzyl phthalate, including mixtures of such solvents or diluents. The carrier vehicle should contain no more than 5% by weight of any moiety which is reactive with the oxidizing agent at room temperature. The carrier vehicle can be a more complex mixture including at least one film-forming binder in addition to inert solvent or diluent. The carrier vehicle can contain, in addition to solvent or solvent and film-forming binder, additives such as external plasticizers, flexibilizers, suspenders and stabilizers, providing that any such additives do not unacceptably adversely affect the stability of the activator composition.

An exemplary two part system includes:

(I) a first package comprising
(a) 10–90, preferably 20–70, weight percent of an olefinic monomer selected from the group consisting of (meth)acrylic acid; esters, amides or nitriles of (meth)acrylic acid; maleate esters; fumerate esters; vinyl esters; conjugated dienes; itaconic acid; styrenic compounds; and vinylidene halides;
(b) 10–80, preferably 20–50, weight percent of the primary toughener;
(c) 1–15, preferably 1–10, weight percent of the auxiliary toughener;

(d) 0–20, preferably 2–10, weight percent of a phosphorus-containing compound having one or more olefinic groups (e) 0.05–10, preferably 0.1–6, weight percent of at least one reducing agent which is interactive with an oxidizing agent to produce free radicals which are capable of initiating and propagating free radical polymerization reactions; and (II) a second package comprising a bonding activator containing an oxidizing agent of a room temperature-active redox couple catalyst system, the oxidizing agent being reactive at room temperature with agent (e) when the first and second packages are mixed to produce free radicals which are capable of initiating and propagating free radical polymerization, the amount of the oxidizing agent being sufficient to interact with agent (e), wherein the weight percents are based on the total amount of the principal components.

The adhesive systems of the invention may be used to bond metal surfaces, such as steel, aluminum and copper, to a variety of substrates, including metal, plastics, and other polymers, reinforced plastics, fibers, glass, ceramics, wood and the like. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bonding at room temperature, thus heat is not required either for applying the adhesive systems to the substrates or for curing.

Although the adhesives of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel including hot dipped, electrogalvanized steel and galvanealed steel.

The adhesive coatings may be brushed, rolled, sprayed, dotted, knifed or otherwise applied to one substrate, but preferably to both substrates to desired thickness preferably not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding. The two metal surfaces and the interposed adhesive composition are maintained in engagement until the said adhesive composition has cured sufficiently to bond the said surfaces.

The following examples are provided for illustration purposes only and are not intended to limit the scope of the invention in any manner.

EXAMPLES

The following masterbatch was prepared:

| Material | Parts by Weight |
|---|---|
| Tetrahydrofurfurylmethacrylate (THFMA) | 16.88 |
| Monomethacryloyloxyethyl phthalate | 2.21 |
| 2-hydroxyethylmethacrylate phosphate | 3.11 |
| isocyanate-capped methacrylate-terminated butadiene oligomer produced from a hydroxyl-terminated polybutadiene as described in the '834 patent (in 20% THFMA) | 44.65 |
| Wollastonite | 8.00 |
| Silica | 4.50 |
| Titania | 2.65 |
| DIIPT | 1.00 |
| Chloroanilic acid | 0.002 |
| Inhibitor (ETHANOX 330 from Albemarle Corp.) | 0.003 |
| 0.2 mm glass beads | 7.60 |
| Total | 90.6 |

EUROPRENE™ was added to the masterbatch as set forth in the table below. The EUROPRENE™ polymer, EUROPRENE™ SOL T 193A, used was a commercial product of EniChem Elastomers Americas, Inc. EUROPRENE™ SOL T 193A is a terblock polymer of styrene and isoprene with polystyrene blocks (25 parts by weight) at the ends and polyisoprene block at the center (75 parts by weight). It is a rubbery solid polymer and has a pellet form. EUROPRENE™ SOL T 193A has a reasonable solubility in THFMA. A 20 part by weight solution of EUROPRENE™ SOL T 193A in THFMA has been used for formulation convenience.

TABLE I

EUROPRENE ™ Ladder vs. T-Peel Property

| Formulation | A | B | C | D |
|---|---|---|---|---|
| Ratio of primary toughener to auxiliary toughener EUROPRENE ™ | 100/0 | 99/1 | 97/3 | 95/5 |
| master batch | 90.60 | 90.60 | 90.60 | 90.60 |
| 20% EUROPRENE ™ | 0 | 1.88 | 5.64 | 9.40 |
| isocyanate-capped methacrylate-terminated butadiene oligomer produced from a hydroxyl-terminated polybutadiene as described in the '834 patent | 2.35 | 1.88 | 0.94 | — |
| THFMA | 7.05 | 5.64 | 2.82 | — |
| Total | 100.00 | 100.00 | 100.00 | 100.00 |

The above four formulations were prepared in 4 oz. polyethylene jars and allowed to age overnight. The formulations were loaded into two-part dispensing equipment (4:1 side A:side B mix ratio by volume). The curative (side B) used here was a benzoyl peroxide containing curing agent.

The substrate (1"×4"×0.032") tested was galvaneal steel. The coupons were bent one inch from the end to give a 90 degree angle. The coupons were treated with an aqueous lubricant (Chempet 4465 available from ADCHEM) with acid brush according to the following preparation for blank wash:

1. Add material with brush until even wetting of surface is maintained when brushing (horizontal).
2. Every five minutes, re-brush until all water has evaporated.

3. After water has evaporated, tilt coupons on about a 45 degree angle and let dry overnight (4 hour minimum).
4. Bond the upper part of the coupon away from drainage.

T-peel samples were assembled and allowed to cure at room temperature overnight, then postbaked at 325° F. for 20 min., cooled at room temperature for 60 min., postbaked again at 250° F. for 30 min. After 4 hours of cooling at room temperature, T-peel test was performed on the Instron (Model 4204) at a 2.0 in/min at room temperature. The T-peel test results are shown below:

TABLE II

EUROPRENE™ Ladder vs. T-Peel Strength (pli)

| Formulation | Versilok® 262 | A | B | C | D |
|---|---|---|---|---|---|
| Toughener ratio | — | 100/0 | 99/1 | 97/3 | 95/5 |
| Peel Strength | 35.3 | 29.2 | 35.6 | 35.0 | 32.8 |
| Std. Dev. of Peel Strength | 2.55 | 0.75 | 0.44 | 1.95 | 0.47 |
| Failure Mode | COH/TCOH | ADH | ADH | COH | COH |

Versilok® 262 is a structural adhesive commercially available from Lord Corporation that does not include two distinct tougheners of different $M_w$ or EUROPRENE. "COH" designates cohesive (substrate) failure, "TCOH" designates a thin layer of cohesive (substrate) failure and "ADH" designates adhesive failure.

Surprisingly, it was observed that (1) incorporating as little as 1% EUROPRENE™ in the masterbatch improves T-peel strength and (2) incorporation of $\geq 3\%$ EUROPRENE™ in the formulation improves failure mode from adhesive to cohesive.

In the next experiment, 3% EUROPRENE™ was introduced into several formulations that have good T-peel strength, but poor failure mode. These formulations include three tougheners. Formulations E, E', F, F', G, G', H and H' were prepared with the following ingredients:

The T-peel properties of these formulations and Versilok® 262 were then evaluated.

TABLE IV

Toughener Composition vs. T-Peel Performance.

| Formulation | T-peel (pli) | Fail.Mode with Europrene™ | Failure Mode without Europrene™ |
|---|---|---|---|
| Versilok® 262 | 35.1 | — | 50% coh/50% tcoh |
| E | 26.9 | — | 50% coh/50% adh |
| E' | 34.6 | coh | — |
| F | — | — | tcoh |
| F' | 36.9 | mostly coh/some tcoh | — |
| G | — | — | adh |
| G' | 33.3 | 50% coh/50% adh | — |
| H | — | — | adh |
| H' | 37.0 | mostly coh/some adh | — |

It was observed that peel failure mode of formulation F was improved from 100% thin cohesive to most cohesive and some thin cohesive, formulations G and H were improved significantly from 100% adhesive to most cohesive to small amount of adhesive. It was surprising that such small amounts of an additive such as EUROPRENE™ with marginal solubility could alter T-peel strength and failure mode to such a great extent.

The effect of high molecular weight auxiliary toughening agent on the peel strength of the cured adhesive was further demonstrated by preparation of the following:

MASTER BATCH:

| Material | Parts by Weight |
|---|---|
| Tetrahydrofurfurylmethacrylate (THFMA) | 14.22 |
| Monomethacryloyloxyethyl phthalate | 2.21 |
| 2-hydroxyethylmethacrylate phosphate | 3.11 |
| isocyanate-capped methacrylate-terminated butadiene oligomer produced from a hydroxyl-terminated polybutadiene as described in the '834 patent (in 20% THFMA) - | 45.53 |

TABLE III

Formulations of Examples E–H

| Ingredient | E | E' | F | F' | G | G' | H | H' |
|---|---|---|---|---|---|---|---|---|
| THFMA | 23.29 | 23.29 | 24.33 | 24.33 | 23.55 | 23.55 | 25.79 | 25.79 |
| Monomethacryloyloxyethyl phthalate | 2.21 | 2.21 | 2.21 | 2.21 | 2.21 | 2.21 | 2.21 | 2.21 |
| 2-Hydroxyethylmethacrylate phosphate | 3.11 | 3.11 | 3.11 | 3.11 | 3.11 | 3.11 | 3.11 | 3.11 |
| '834 patent toughener in 20% THFMA | 47.00 | 45.6 | 37.60 | 37.60 | 44.65 | 44.65 | 23.50 | 23.50 |
| '419 patent toughener in 10% methacrylate | 0 | 0 | 8.36 | 8.36 | 2.11 | 2.11 | 0 | 0 |
| '419 patent toughener in 10% THFMA | 0 | 0 | 0 | 0 | 0 | 0 | 21.0 | 21.0 |
| EUROPRENE™ in 20% THFMA | 0 | 5.60 | 0 | 5.80 | 0 | 5.80 | 0 | 5.80 |
| Wollastonite | 8.0 | 8.0 | 8.0 | 8.0 | 8.0 | 8.0 | 8.0 | 8.0 |
| Silica | 5.14 | 5.14 | 5.14 | 5.14 | 5.14 | 5.14 | 5.14 | 5.14 |
| Titania | 2.65 | 2.65 | 2.65 | 2.65 | 2.65 | 2.65 | 2.65 | 2.65 |
| DHPT | 1.00 | 1.00 | 1.00 | 1.00 | 1.00 | 1.00 | 1.00 | 1.00 |
| Stabilizer I | 0.002 | 0.002 | 0.002 | 0.002 | 0.002 | 0.002 | 0.002 | 0.002 |
| Stabilizer II | 0.003 | 0.003 | 0.003 | 0.003 | 0.003 | 0.003 | 0.003 | 0.003 |
| 0.2 mm glass beads | 7.60 | 7.60 | 7.60 | 7.60 | 7.60 | 7.60 | 7.60 | 7.60 |
| Total Parts by weight | 100.0 | 103.2 | 100.0 | 105.8 | 100.0 | 105.8 | 100.0 | 105.8 |

-continued

MASTER BATCH:

| Material | Parts by Weight |
|---|---|
| (approximately 280 days old) | |
| Wollastonite | 8.00 |
| Silica | 4.00 |
| Titania | 2.65 |
| DIIPT | 1.30 |
| Stabilizer I | 0.003 |
| Stabilizer II | 0.004 |
| alpha methyl styrene | 0.070 |
| 0.2 mm glass beads | 7.60 |
| Total | 88.7 |

Auxiliary tougheners were added (5% by weight) dissolved in THFMA (20% parts by weight of toughener in solvent). Peel strengths of the cured adhesives were measured and tabulated.

TABLE V

Effect of auxiliary toughener composition on master batches prepared with primary toughening agent of '834 patent.

| Auxiliary Toughener | $M_n^2$ Daltons | $M_w^3$ Daltons | Supplier and/or composition | T-Peel (PLI) |
|---|---|---|---|---|
| No Auxiliary - Primary Toughener '834 (Comparative Example I) | | | Toughening Agent of '834 - Less than 180 days old | 26.9 |
| No Auxiliary - Primary Toughener '834 (Comparative Example J) | 5,720 | 17,300 | Toughening Agent of '834 - Approximately 280 days old. | 31.9 |
| Europrene 193A, (Example K) styrene-isoprene-styrene block copolymer $M_w^1$ = 138,000–152,000 | 119,000 | 149,000 | EniChem Elastomers Americas, Inc. .25 styrene, .75 isoprene | 37.1 |
| Europrene 190 (Example L) $M_w^1$ = 155,000–185,000 | 143,000 | 185,000 | EniChem Elastomers Americas, Inc. .16 styrene, .84 isoprene | 35.8 |
| Europrene 9113 (Example M) $M_w^1$ = 135,000–150,000 | 136,000 | 148,000 | EniChem Elastomers Americas, Inc. .18 styrene, .82 isoprene | 37.8 |
| Europrene 193B, (Example N) $M_w^1$ = 120,000–140,000 | 107,000 | 130,000 | EniChem Elastomers Americas, Inc. .25 styrene .75 isoprene | 38.7 |
| Polybutadiene (Example O) | 21,900 | 418,000 | Aldrich | 36.9 |
| Kraton D1102 (Example P) styrene butadiene block copolymer | 92,200 | 105,000 | Shell | 37.4 |
| Neoprene - Polychloroprene (Ex. Q) | 25,900 | 457,000 | DuPont | 36.2 |
| Hypalon 20 - (Example R) chlorosulfonated polyethylene | 23,800 | 226,000 | DuPont | 32.8 |
| Nipol 1312V (Comparative Example S) styrene-butadiene random copolymer | 3,160 | 8,320 | Zeon Chemicals, Inc. | 28.8 |
| Ricon 131 - Maleated butadiene (Comparative Example T) | 8,690 | 12,100 | Ricon Chemicals | 31.0 |

[1]$M_w$ provided by supplier
[2]$M_n$ measured by Lord Corp.
[3]$M_w$ measured by Lord Corp.

The measured values of peel strength show that when the weight averaged molecular weight of the auxiliary toughener exceeds a value of approximately 18,000 and the number average exceeds a value of approximately 10,000 the peel strength of the resulting cured adhesive unexpectedly improves. This effect is not observed for the lower molecular weight auxiliary tougheners (Comparative Example S and Comparative Example T).

What is claimed is:

1. An adhesive composition comprising:
   (a) about 10–90% by weight of at least one free radical-polymerizable monomer;
   (b) about 0–20% by weight of an adhesion promoter;
   (c) about 10–80% by weight of a primary low molecular weight toughener with a weight average molecular weight ($M_w$) less than about 18,000 or a number average molecular number ($M_n$) less than about 10,000 and;
   (d) about 1–15% by weight of an auxiliary high molecular weight toughener with a $M_w$ greater than about 18,000 or a $M_n$ greater than about 10,000
   wherein the weight percents are based on the total weight of components (a)–(d).

2. An adhesive composition according to claim 1 wherein the primary toughener comprises an olefinic-terminated liquid elastomer produced from a hydroxyl-terminated polyalkadiene.

3. An adhesive composition according to claim 1 wherein the auxiliary toughener comprises an A-B-A block copolymer wherein the A block is selected from styrene, ring alkylated styrene or a mixture thereof and the B block is an elastomeric segment having a low $T_g$ selected from conjugated diene or ethylene-propylene.

4. An adhesive composition according to claim 3 wherein the auxiliary toughener is present in an amount of about 1 to 10 weight percent.

5. An adhesive composition according to claim 3 wherein the primary toughener comprises an olefinic-terminated liquid elastomer produced from a hydroxyl-terminated polyalkadiene.

6. A two-part, reactive structural adhesive comprising:
   (a) a first part comprising
      (i) at least one free radical-polymerizable monomer;
      (ii) a primary low molecular weight toughener with a weight average molecular weight ($M_w$) less than about 18,000 or a number average molecular number ($M_n$) less than about 10,000;
      (iii) an auxiliary high molecular weight toughener with a $M_w$ greater than about 18,000 or a $M_n$ greater than about 10,000; and
      (iv) at least one reducing agent; and (b) a second part comprising an oxidizing agent that is reactive at room temperature with the reducing agent to produce free radicals that are capable of initiating and propagating free radical polymerization.

7. An adhesive according to claim 6 wherein the primary toughener comprises an olefinic-terminated liquid elastomer produced from a hydroxyl-terminated polyalkadiene.

8. An adhesive according to claim 6 wherein the auxiliary toughener comprises an A-B-A block copolymer wherein the A block is selected from styrene, ring alkylated styrene or a mixture thereof and the B block is an elastomeric segment having a low $T_g$ selected from conjugated diene or ethylene-propylene.

9. An adhesive according to claim 6 wherein the auxiliary toughener is present in an amount of about 1 to 10 weight percent.

10. An adhesive according to claim 8 wherein the primary toughener comprises an olefinic-terminated liquid elastomer produced from a hydroxyl-terminated polyalkadiene.

11. An adhesive according to claim 6 wherein the reducing agent has a formula (I)

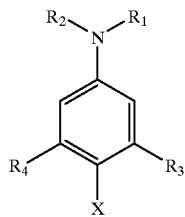

wherein each of $R_1$ and $R_2$, which may be the same or different, is independently selected from the group consisting of linear or branched, saturated or unsaturated, C1–C10 alkyl and linear or branched, saturated or unsaturated, C1–C10 hydroxyalkyl (i.e., alkyl substituted by —OH);

each of $R_3$ and $R_4$ is independently selected from the group consisting of hydrogen and linear or branched, saturated or unsaturated C1–C10 alkyl; and X is halogen.

12. An adhesive according to claim 11 wherein the reducing agent is selected from N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; and N,N-diethyl-p-bromoaniline.

13. An adhesive according to claim 11 wherein the primary toughener comprises an olefinic-terminated liquid elastomer produced from a hydroxyl-terminated polyalkadiene and the auxiliary toughener comprises an A-B-A block copolymer wherein the A block is selected from styrene, ring alkylated styrene or a mixture thereof and the B block is an elastomeric segment having a low $T_g$ selected from conjugated diene or ethylene-propylene.

14. An adhesive composition comprising at least one free radical polymerizable monomer and at least two tougheners, wherein a first toughener has a $M_w$ that is at least 50% greater than a $M_w$ of a second toughener.

15. An adhesive composition comprising at least one free radical polymerizable liquid monomer and at least two tougheners, wherein a first toughener has a solubility in said liquid monomer and a second toughener has a solubility in said liquid monomer higher than the solubility of the first toughener.

* * * * *